Oct. 17, 1961 W. A. LEDWITH 3,004,386
ROCKET NOZZLE TUBE CONSTRUCTION
Filed June 23, 1959
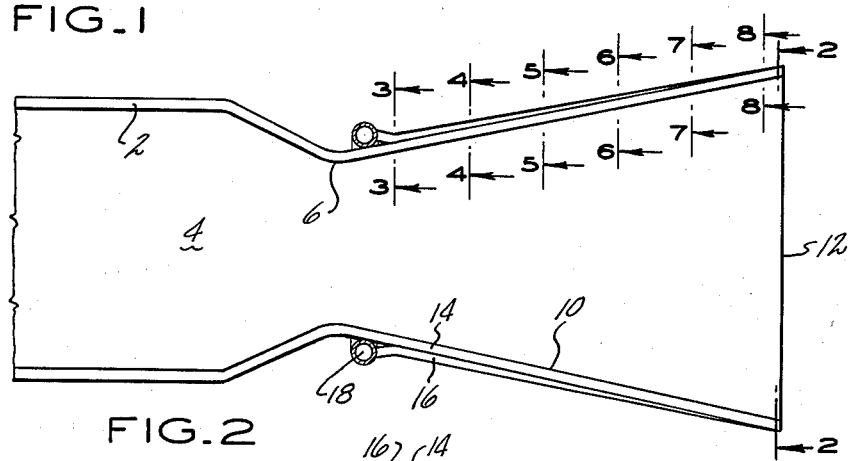
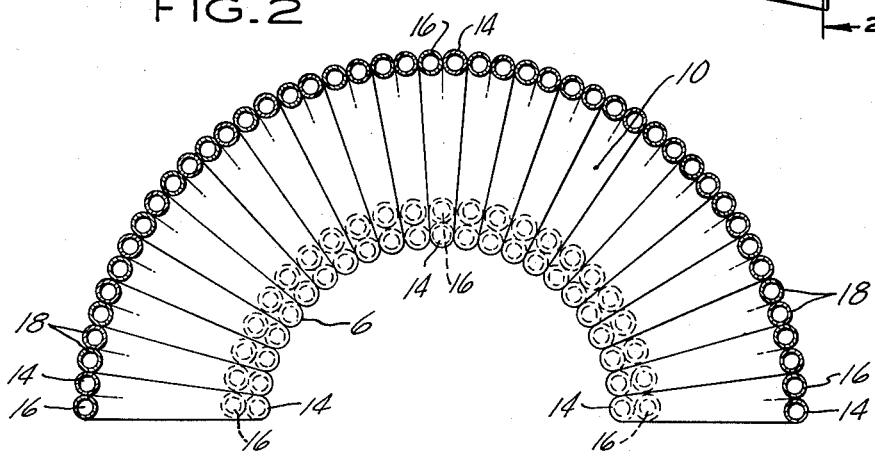
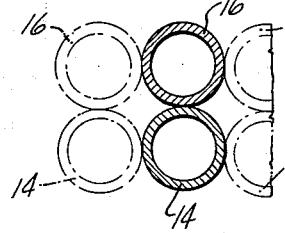 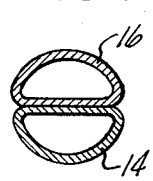 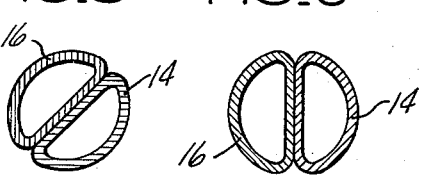
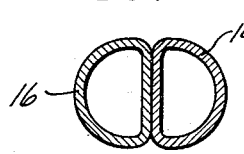 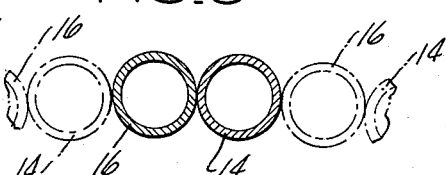
INVENTOR
WALTER A. LEDWITH
BY
ATTORNEY

3,004,386
ROCKET NOZZLE TUBE CONSTRUCTION
Walter A. Ledwith, Glastonbury, Conn., assignor to United Aircraft Corporation, East Hartford, Conn., a corporation of Delaware
Filed June 23, 1959, Ser. No. 822,375
10 Claims. (Cl. 60—35.6)

This invention relates to a cooled rocket wall made up of tubular elements.

One feature of this invention is an annular wall varying in diameter and made up of tubes arranged in pairs and twisted from radially aligned tubes to circumferentially aligned tubes as the diameter of the annular wall increases. Another feature is the flattening of each tube of the pair to a semielliptical or semicircular shape in order to approach a single thickness of tubular wall in a relatively short axial distance.

The use of radially staggered tubes is shown in the copending application of Tumavicus, Serial No. 816,738, filed May 25, 1959, and having the same assignee as this application. One feature of the present invention is the radial deformation of the tubes arranged in pairs in such a way as to produce the equivalent of a single tubular shape from the pair of tubes.

Other features and advantages will be apparent from the specification and claims, and from the accompanying drawing which illustrates an embodiment of the invention.

FIG. 1 is a sectional view through a rocket embodying the invention.

FIG. 2 is a sectional end view of the rocket on a somewhat larger scale along line 2—2 of FIG. 1.

FIG. 3 is a fragmentary sectional view on a larger scale substantially along the line 3—3 of FIG. 1.

FIG. 4 is an enlarged fragmentary view along the line 4—4 of FIG. 1.

FIG. 5 is an enlarged fragmentary view along the line 5—5 of FIG. 1.

FIG. 6 is an enlarged fragmentary view along the line 6—6 of FIG. 1.

FIG. 7 is an enlarged fragmentary view along the line 7—7 of FIG. 1.

FIG. 8 is an enlarged fragmentary view along the line 8—8 of FIG. 1.

The invention is shown in a rocket having a wall 2 defining a combustion chamber 4. The wall is annular and decreases in diameter at the throat 6 of the nozzle and then increases in diameter to form the divergent portion 10 of the nozzle terminating in the trailing edge 12. The wall 2 is made up of tubes which extend axially and are preferably arranged in side-by-side contact being suitably brazed together to define a continuous wall.

In a portion of the wall where the diameter of the annulus is varying, as for example, downstream of the throat 6, a construction is utilized that permits a substantial increase in diameter. To accomplish this, the wall, at a smaller diameter portion of the wall construction, as for example, at the line 3—3 of FIG. 1, is made up of an inner row of tubes 14 surrounded by an outer row of tubes 16, these tubes being arranged in pairs with one tube 14 and the radially aligned tube 16 constituting a pair of tubes. All of the tubes 16 may be connected to a manifold 18, as shown in FIG. 1.

As the diameter of the annular wall increases, each pair of tubes is flattened, as shown in FIG. 4, such that each tube 14 or 16 becomes substantially semicircular in shape with the flattened sides of the pair of tubes in contact, as shown, and with the tube 16 still radially outwardly of the tube 14. Together the flattened tubes produce in effect a single tubular shape.

At a somewhat greater diameter of the nozzle wall the tubes are flattened somewhat more toward a semielliptical shape and the pair of tubes are twisted together about the axis of the tubes through a small angle, as best shown in FIG. 5.

As the wall diameter further increases the tubes continue to have a twist so that at approximately the section line 6—6 the tubes are still semielliptical in shape but equally spaced radially from the nozzle axis and are thus in circumferentially side-by-side relationship. The pair of tubes have now been twisted through a 90° angle.

With a still further increase in wall diameter the tubes are less flattened to increase the circumferential dimension of the pair of tubes as is necessary to accommodate the same sector of the wall at the greater diameter. This arrangement is shown in FIG. 7 where the flattening is less apparent but the tubes are still in circumferentially side-by-side relation. As the wall diameter continues to increase the tubes become less and less semicircular or semielliptical until at the outer end of the nozzle where the wall diameter is the largest the tubes are again undeformed and are in side-by-side contact in a circumferential direction.

This arrangement permits the wall dimension to vary substantially from the smallest diameter to the largest. It may be desirable where additional change in diameter is necessary to flatten the tubes in a radial direction beyond the semicircular shape of FIG. 8 so as to provide a circumferentially greater dimension for each tube. The arrangement described permits the introduction of additional tubes and the positioning of these tubes respectively in side-by-side relation without restricting the rate of change of dimension of the nozzle wall. That is to say, by selectively varying the deformation of the tubes axially of the wall the change in diameter of the wall may be other than linear so that the opposite wall surfaces may curve away from each other rather than to diverge rectilinearly.

It is to be understood that the invention is not limited to the specific embodiment herein illustrated and described, but may be used in other ways without departure from its spirit as defined by the following claims.

I claim:

1. A substantially annular wall construction for a rocket, in which the wall varies in diameter from end-to-end, said wall construction including a plurality of axially extending tubes arranged in a ring to form the annular wall, said tubes being arranged in pairs and each pair of tubes being in contact with adjacent pairs of tubes, the tubes of each pair being in radial alignment with each other at smaller diameters of the wall and in circumferential alignment with each other at larger diameters of the wall, each tube of the pair being flattened substantially to semicircular shape between the smaller and larger diameters.

2. A wall construction as in claim 1 wherein at all diameters of the wall each pair of tubes occupies an equal angular sector of the wall.

3. A wall construction as in claim 1 in which the tubes of each pair are flattened on one side with the flattened sides of the tubes of each pair in contact and with the tubes of each pair twisted between said smaller and larger diameters.

4. A wall construction as in claim 1 in which the tubes of each pair are flattened on one side with the flattened sides of the tubes of each pair in contact and with the tubes of each pair twisted between said smaller and larger diameters, and wherein at all diameters of the wall each pair of tubes occupies an equal angular sector of the wall throughout the length thereof.

5. A wall construction as in claim 1 in which the flattened sides of the tubes of each pair are in contact with each other to produce in effect a single continuously curved tubular shape.

6. A wall construction as in claim 1 in which the tubes are hollow for the flow of a coolant therethrough.

7. A wall construction as in claim 1 in which the tubes of each pair are flattened on one side and twisted through a substantially 90° angle from the smaller diameter to the larger diameter.

8. A cooled substantially annular wall construction for a rocket in which the wall varies in diameter from end-to-end, including a plurality of tubes extending axially of said annular wall and arranged in pairs, the tubes of each pair being in radial alignment with one another at smaller diameters of the wall and being twisted as a pair to circumferentially side-by-side relation at larger diameters with the pair of tubes being flattened substantially to semicircular shape between these diameters.

9. A wall construction as in claim 8 in which the flattened sides of the tubes of each pair are in contact to produce in effect a single continuously curved tubular shape.

10. A wall construction as in claim 8 in which the inner tube of each pair of tubes extends beyond the end of the outer tube of each pair at the smaller diameter of the wall and in which a manifold surrounds the extended inner tubes and is connected to said outer tube at this smaller diameter.

References Cited in the file of this patent

UNITED STATES PATENTS 2,880,577     Halford et al. _____ Apr. 7, 1959

FOREIGN PATENTS 809,844     Great Britain _____ Mar. 4, 1959